June 15, 1926.

M. F. LERCH

NUT LOCK

Filed Oct. 28, 1924

1,588,478

Inventor
M. F. Lerch,
By
Attorney

WITNESS:—

Patented June 15, 1926.

1,588,478

UNITED STATES PATENT OFFICE.

MARSHEL F. LERCH, OF LOUISVILLE, KENTUCKY, ASSIGNOR TO LERCH, SHUMATE BOLT COMPANY, OF LOUISVILLE, KENTUCKY.

NUT LOCK.

Application filed October 28, 1924. Serial No. 746,308.

This invention relates to nut locking means of the type which embodies a bolt having reversely screw-threaded portions and a screw-threaded locking member upon one of the screw-threaded portions of the bolt and adapted to engage the nut on the other screw-threaded portion of the bolt and lock the nut against being accidently unscrewed.

The object of the present invention is to provide a new and useful locking member which may be conveniently and inexpensively formed from an ordinary nut blank, and which is provided with new and useful means for engagement with the outer face of a nut so as to interlock the two members in a simple and effective manner.

While capable of general application, the present invention is primarily intended for use in connection with the bolts and nuts employed for securing together the elements of rail-joints where the bolts and nuts are subject to repeated violent vibrations tending to loosen the nuts on the bolts.

Figure 1:
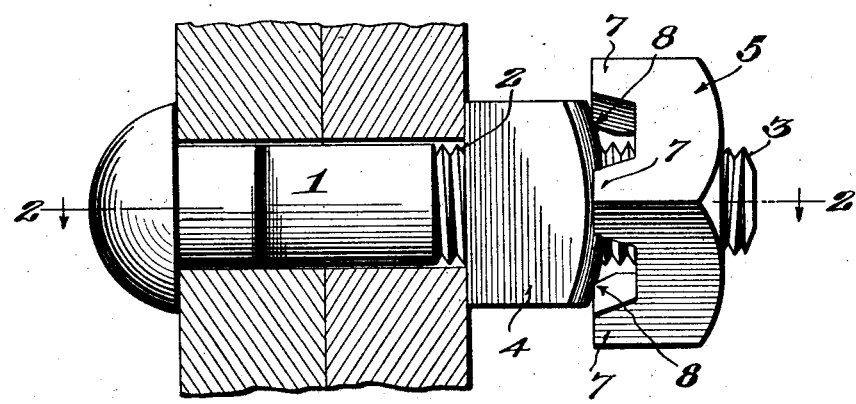
Figure 1 is a side elevation of a bolt and nut having the locking member of the present invention applied thereto.
Figure 2:
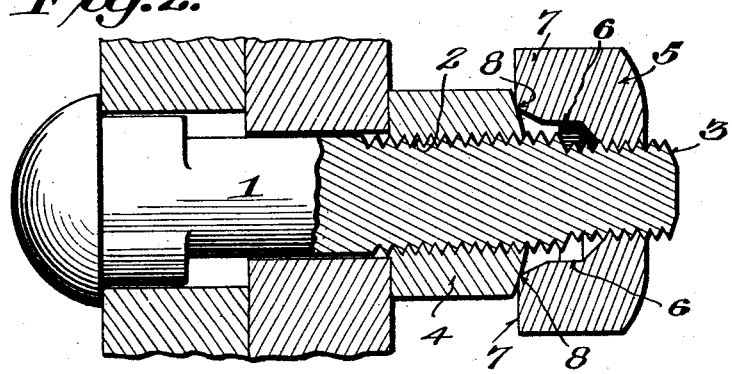
Figure 2 is a longitudinal sectional view of Figure 1.

In the accompanying drawing, the reference character 1 designates a bolt having the usual screw-threaded portion 2 and also provided with the reduced terminal portion 3 which is screw-threaded reversely to the main screw-threaded portion 2 of the bolt. A nut 4 of common type is mounted upon the main screw-threaded portion 2 in the usual manner, while the locking member 5 is upon the reduced bolt portion 3.

Figure 3:
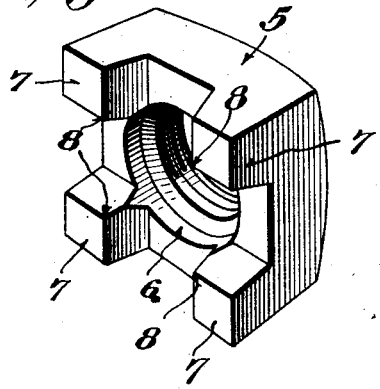
Figure 3 is a perspective view of the nut locking member.

As best shown in Figure 3 of the drawing it will be seen that the nut locking member has the general form of a nut. The screw-threaded bore of the locking member is counter-bored as at 6, and this counter-bore is located at what is the inner face of the locking member when the latter is in use. Integral bosses or projections 7 are provided upon the inner face of the locking member and at the four corners thereof, the outer faces of the projections being continuations of the corresponding faces of the lock member. These projections are substantially rectangular in cross section and have relatively sharp inner corners 8 which lie adjacent the bore of the locking member. Considering the size of the locking nut, the rectangular cross-area of each projection 7 is extensive throughout its entire length, which imparts rigidity to the projection.

In using the present invention, the nut 4 is set up tightly against one of the fish-plates of the rail-joint in the usual manner, and thereafter the locking member 5 is applied to the reduced screw-threaded terminal portion of the bolt and set up tightly against the nut 4 whereby the sharp inner corners 8 of the locking bosses or projections 7 impinge against and dig into the front convexed face of the nut 4 so as to form an effective interlocking engagement between the nut 4 and the locking member 5, and any tendency of the nut 4 to unscrew upon the screw threaded portion 2 of the bolt will be effectually prevented by the locking member, for the reason that the direction of movement of the nut 4 in unscrewing is the direction of movement of the locking member for screwing or feeding the locking member inwardly along the bolt. It will of course be understood that in setting the nut against the fish-plate, a great deal of power is exerted, and likewise a great deal of power is employed in setting the locking member against the nut.

The function of the counter-bore 6 is to receive the outer end of the major portion of the bolt in the event that the front face of the nut 4 is a material distance in rear of the front end of the major portion of the bolt.

It will be noted that the actual contacting area between the front convexed face of the nut 4 and the corners of the locking bosses or projections 7 is very small, and therefore the nut and the locking member cannot become interlocked by corrosion sufficient to prevent forcible unscrewing of the locking member. Furthermore, the spaces provided between the successive bosses or projections 7 prevent the accumulation of foreign matter such as might otherwise prevent forcible unscrewing of the locking member.

While not absolutely essential to the present invention, it is preferred to have the screw-threads 2 somewhat coarser than the screw-threads on the reduced portion 3, whereby the nut 4 will travel much faster than the locking member 5, and in the event that the two members should become disengaged and vibration should cause each of the members to work out towards the outer end of the bolt, the nut will promptly overtake the locking member and immediately effect an interengagement and locking of the members, wherefore accidental displacement of the locking member from the bolt is effectually prevented.

The locking member of the present invention is an integral element and may be die-stamped from an ordinary nut blank. While it is preferable to have the locking member of the same peripheral size and shape as the nut, in order that the same wrench may be applied to the nut and to the locking member, it will of course be understood that this similarity in size and shape is not absolutely essential to the present invention, but of course is important from the standpoint of practicability. The locking member may be of less thickness than the nut for the reason that the locking member is not subjected to the severe strains and stresses to which the nut is subjected, and it is believed that a thickness sufficient to take three threads in the bore of the locking member will be satisfactory.

What is claimed is:

The combination with a bolt having oppositely screw-threaded portions, of a main nut turned onto the inner screw-threaded portion of the bolt and having a convex outer face, a locking nut turned onto the outer screw-threaded portion of the bolt to hold the main nut in place, said locking nut having integral projections on its inner face at the corners thereof, each of said projections being of large rectangular cross-area throughout its length to impart rigidity to the projection, the rectangular formation providing an abrupt interior corner at the extremity of the projection to bite into the convex face of the main nut when the locking nut is turned to bear against the main nut.

In testimony whereof I have signed my name to this specification.

MARSHEL F. LERCH.